United States Patent [19]
Voegtlin et al.

[11] 3,761,948
[45] Sept. 25, 1973

[54] RECORDING INSTRUMENT FOR TWO DIAGRAM SHEETS

[75] Inventors: Karl Voegtlin, Villingen; Hans Zimmerman, Schwenningen; Karl Doerner, Villingen, all of Germany

[73] Assignee: Kienzle Apparate GmbH, Villingen/Schwarzwald, Germany

[22] Filed: Dec. 6, 1972

[21] Appl. No.: 312,519

[30] Foreign Application Priority Data
Dec. 7, 1971  Germany................... P 21 60 510.7

[52] U.S. Cl.................................. 346/44, 346/137
[51] Int. Cl...................................................... G01d
[58] Field of Search..................... 346/18, 137, 121, 346/123, 44, 45

[56] References Cited
UNITED STATES PATENTS
3,259,906  7/1966  Falk.................................. 346/137
2,739,031  3/1956  Meer................................. 346/137

FOREIGN PATENTS OR APPLICATIONS
757,885    8/1952  Germany........................... 346/18
1,321,026  2/1963  France.............................. 346/137
1,410,660  8/1965  France.............................. 346/137
959,232    2/1957  Germany........................... 346/18
1,056,401  4/1959  Germany........................... 346/18

Primary Examiner—Richard B. Wilkinson
Assistant Examiner—Pat Salce
Attorney—Michael S. Striker

[57] ABSTRACT

A recording instrument for a motor car, has a cylindrical casing containing measuring means driven to measure speed and mileage and other parameters, and a casing lid housing a clockwork rotating a first diagram sheet in a first recording plane and a second diagram sheet in a second axially spaced recording plane. A carrier for first recording means is pivotally mounted on the casing lid, and is tiltable to and from a recording position located between the first and second diagram sheets so that the first recording means records on the first diagram sheet when coupled with and driven by the measuring means in the closed position of the casing lid. Second recording means driven by other measuring means in the cylinder casing, record on the second diagram sheet. When the casing lid is opened, and the carrier is angularly displaced out of the recording position, the two diagram sheets can be easily assembled and inspected.

17 Claims, 10 Drawing Figures

Patented Sept. 25, 1973

Patented Sept. 25, 1973 3,761,948

Patented Sept. 25, 1973

RECORDING INSTRUMENT FOR TWO DIAGRAM SHEETS

BACKGROUND OF THE INVENTION

The invention relates to a recording instrument particularly for a motor car with diagram sheets driven by a clockwork, and receiving recordings during operation of the motor car for registering speed and mileage, and other parameters of the operation of the motor car.

In recording instruments of this type, circular diagram sheets are used which have the advantage of easy handling during insertion and removal, while being easily readable for determining the recorded data. The disadvantages of circular diagram sheets, as compared with a record carrier tape, are the different ratios at which concentric recordings are made at different radial distances from the center of the diagram sheet. Consequently, only the outer annular zone of a circular diagram sheet can be used for recordings which are related to time.

Since a recording instrument for a motor car must record the speed of the car, requiring a recording track which is comparatively broad in radial direction, only little space remains available for the other recordings. Since, on the other hand, the diameter of the diagram sheet determines the diameter of the casing of the recording instrument, which is substantially standardized to fit into dashboard openings, the diameter of the instrument casing cannot be increased, and the limited diameter of the diagram sheet prevents the recording of certain data.

In order to overcome this disadvantage of circular diagram sheets, it has been proposed to record the rotary speed of the motor on the rear face of the diagram sheet. It has also been proposed to use a second diagram sheet, which is superimposed on the first diagram sheet in a back-to-back position so that the two diagram sheets rotate in synchronism. While a greater number of data can be recorded on two recording faces than on a single recording face of a diagram sheet having recording only on one side, other disadvantages cannot be avoided. For example, due to the coating on two sides, the handling of such a diagram sheet becomes difficult, and finger prints and scratches cannot be prevented. Furthermore, such a double diagram sheet must be specially manufactured, which is a disadvantage as compared with standard diagram sheets. Another disadvantage of recording on the front and rear of a diagram sheet is the fact that the recordings are made in opposite directions, that during the read-out and evaluation, the finding of associated data causes considerable difficulties.

The German Pat. No. 959,232 discloses a recording instrument which permits simultaneous recording on at least two diagram sheets in such a manner that identical diagram sheets with printed coordinates can simultaneously receive recordings in the same direction. In the apparatus of the German patent, two diagram sheets are secured in axially spaced position to the drive shaft of the clockwork, and a recording arm, which can be angularly displaced in a plane parallel to the two diagram sheets between the diagram sheets, is coupled with drive means in the casing.

In such an arrangement, the mounting of the recording arm outward of the periphery of the diagram sheets in the casing of the apparatus, causes great difficulties in view of the fact that the diameter of the casing, and also the diameter of the diagram sheets are given values which should not be modified. Furthermore, the removal and insertion of the lower diagram sheet is only possible when the recording arm is completely moved out of the space covered by the diagram sheets. In such an arrangement, the outside located recording arm, which is delicately adjusted to produce the desired recording pressure on the diagram sheet, may be bent during the handling of the diagram sheets, unless a special protecting shield is provided. Furthermore, when the cover lid of the instrument is closed by mistake without returning the recording arm to its inner recording position, the recording arm is damaged.

Normal return of the recording arm to its recording position is difficult since the recording point, which is slightly biased, does not lie in the plane of the diagram sheet when the recording arm is turned to its position of rest outside of the diagram sheet.

Therefore, it is necessary to lift the recording point at least outward of the diagram sheets in order to prevent the recording of a line during the displacement of the recording arm. This is a disadvantage, since the axial distance between the two diagram sheets is to be as small as possible to obtain a compact instrument.

SUMMARY OF THE INVENTION

It is one object of the invention to provide a recording instrument permitting the simultaneous recording on two standard diagram sheets.

It is another object of the invention to overcome the disadvantages of known recording instruments for recording on two diagram sheets.

Another object of the invention is to arrange recording means between two simultaneously rotating diagram sheets for recording on the front face of only one diagram sheet.

With these objects in view, the present invention provides a carrier for supporting a recording means effective between two diagram sheets, the carrier being mounted on the casing lid of the instrument containing the clockwork drive means for the diagram sheets, and in a manner that it is movable in a plane which is substantially perpendicular to the recording plane.

In a preferred embodiment of the invention, the carrier is mounted on the casing lid for turning movement about an axis which is parallel to the hinge axis between casing for the measuring means, and the casing lid for the clockwork.

The carrier preferably has a wall at least partly covering one of the diagram sheets, and supporting the other diagram sheet against the pressure exerted by the recording means.

It is an advantage of the present invention that the recording means which is effective between the two diagram sheets, can be tilted by means of the carrier so far that an undisturbed handling and servicing of the diagram sheets is possible, particularly since the wall of the carrier serves as a recording support for the second diagram sheet.

The mounting of the carrier can be selected so that the same can be automatically turned back when the casing lid is closed, if it was forgotten to return the carrier to its normal position while the casing was open. The normal position of the carrier is the recording position in which the carrier wall is parallel to the diagram sheets.

In the arrangement of the invention, the inner diameter of the casing is fully used since the diagram sheets have a diameter only slightly less than the inner diameter of the casing. A particularly advantageous construction of the invention is the control of the recording means on the carrier by a magnetic part of the measuring means, which permits the placing of the magnetic coupling parts of the recording means and of the measuring means to cooperate through the second diagram sheet, without using any peripheral space. A perpendicular setting of the recording point on the first diagram sheet is advantageous, since an initial line can be avoided, which may disturb the later evaluation of the recordings on the diagram sheet. The construction of the carrier as a pivotally mounted flap, assures protection of the respective diagram sheet and of the recording means against damage.

In a preferred embodiment of the invention, the carrier of the recording means can be locked to the casing lid, so that only authorized persons, using a special key, can remove the diagram sheets held in position by the locked carrier flap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
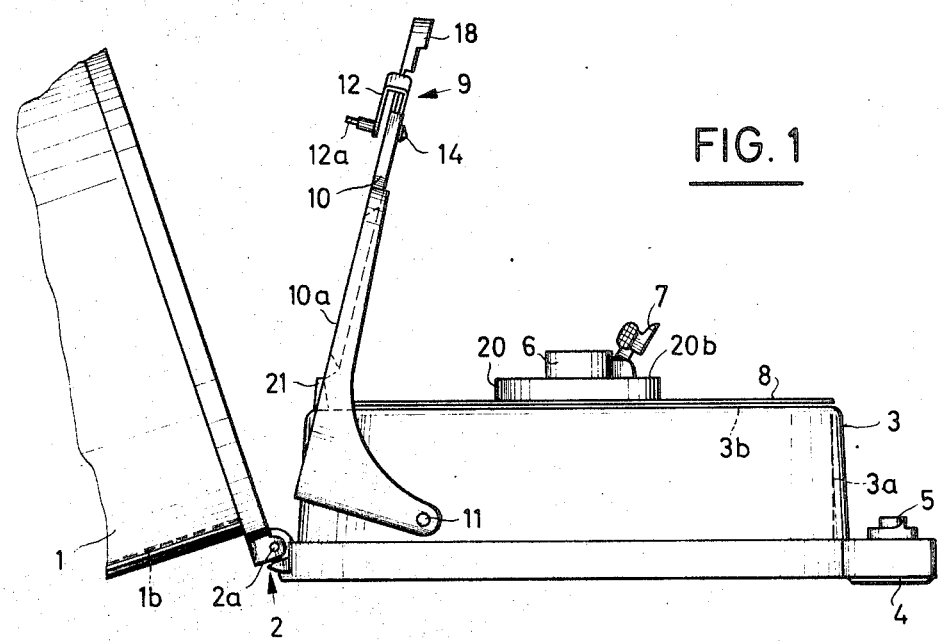
FIG. 1 is a fragmentary schematic side view illustrating an embodiment of the invention in an open position in which diagram sheets can be removed and inserted.

The recording instrument comprises, as usual, a cylindrical casing 1 which is connected by a hinge or pivot 2 with a second casing in the form of a lid 3. The lid 3 has a lock 4 whose bolt 5 is operated to engage a corresponding opening 1a in the casing 1 so that casing 1 and casing 3 are locked together.

Figure 8:
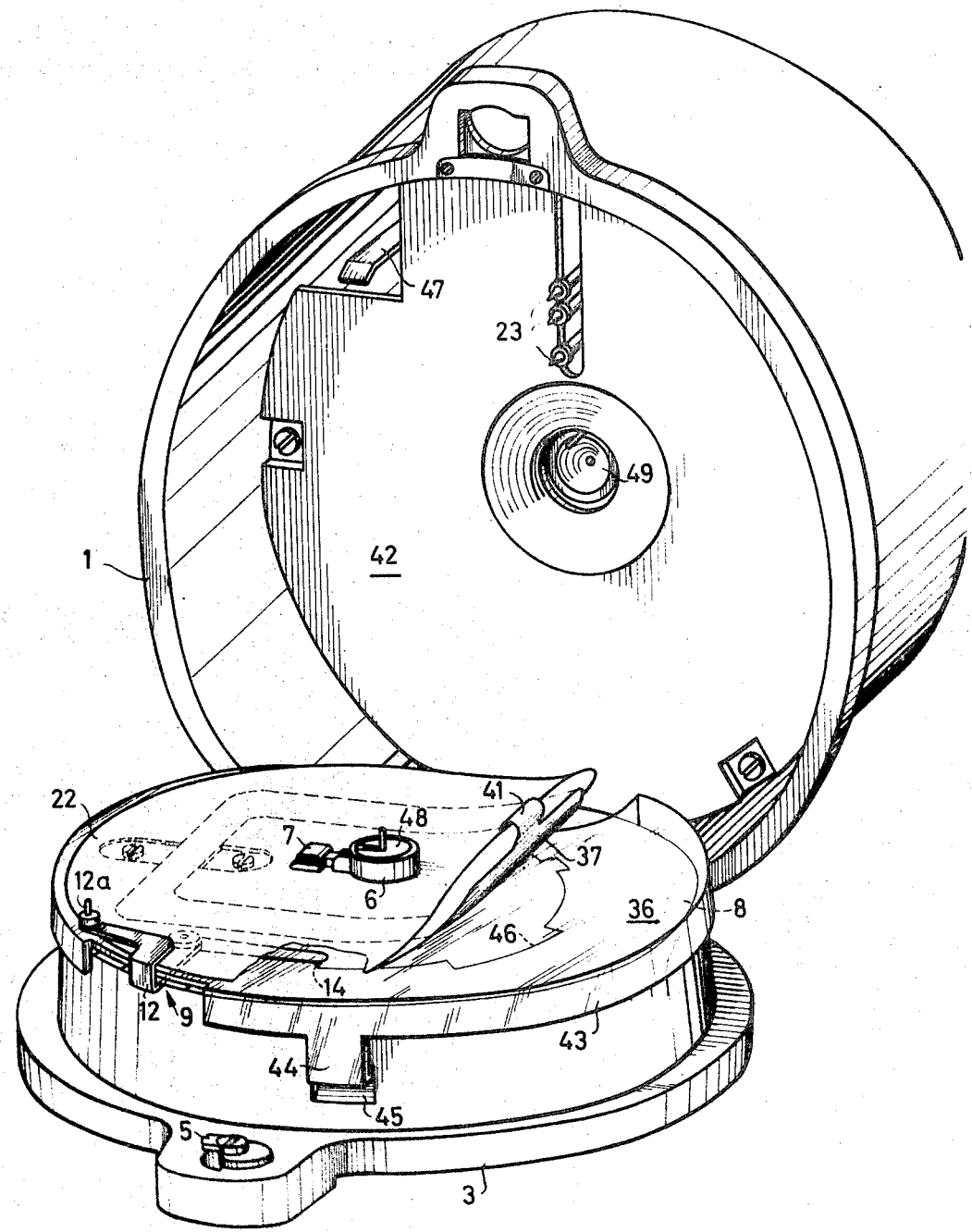
FIG. 8 is a perspective view illustrating a modified embodiment in open position, and showing a leaf spring for facilitating the gripping of the upper diagram sheet.

As usual, measuring means are mounted within the casing 1, of which only a part 47 is shown in FIG. 8. Such measuring means may include an Eddy current motor and transmission means for transmitting the speed to indicating devices located in the casing 3, and additional devices for recording working times and idle periods of the operators of a truck which may be recorded by recording means 23 mounted in casing 1 on a circular diagram sheet 22 shown in the upper portion of FIG. 3. In casing or lid 3, a clockwork 3a is provided which includes a rotary support with a supporting surface 3b for a diagram sheet 8. An odometer may also be provided in casing 3 and viewed through a transparent glass plate.

Diagram sheets 8 and 22 are of conventional type and have a central opening by means of which they can be mounted on a center pin 6 which is fixedly connected with support 3b for rotation. Center pin 6 is provided with means for clamping both diagram sheets to the rotary support of the clockwork 3a, for example a clamping lever 7. The supporting surface 3b serves for supporting the diagram sheet 8, and to resist the pressure exerted by a recording means 9.

Figure 3:
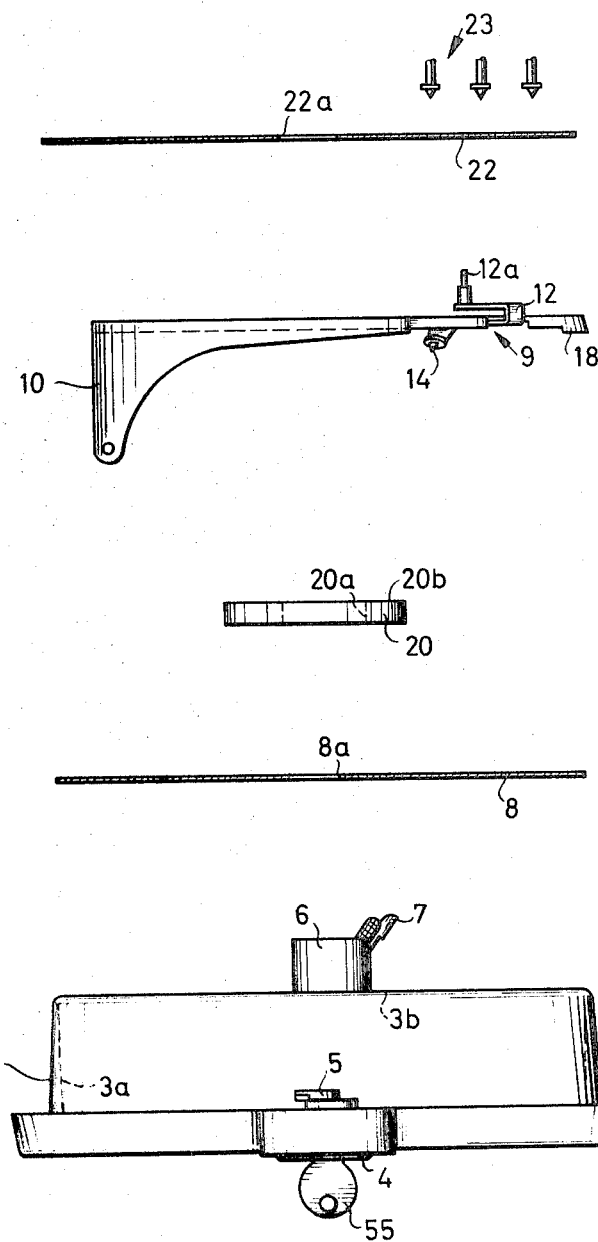
FIG. 3 is a fragmentary exploded side view illustrating the assembly of two diagram sheets with the carrier and a spacing ring for the diagram sheets.

As shown in the exploded view of FIG. 3, the first diagram sheet 8 is placed with its central opening 8a on the center pin 6 which rotates with the rotary support surface 3b due to the clockwork 3a. When diagram sheet 8 is thus placed on the supporting surface 3b, a spacing ring 20 is placed on the diagram sheet 8, surrounding the center pin 6. FIG. 3 shows a carrier 10, whose function will be explained hereinafter, and which can be turned to the position shown in FIG. 1, so that a second diagram sheet 22 can be placed with its center opening 22a on the remaining portion of the central pin 6, whereupon the clamping lever 7 is operated to clamp the two diagram sheets 8 and 22, spaced by the spacing ring 20, to the rotary supporting surface 3b so that both diagram sheets 8 and 22 rotate in synchronism, with the diagram sheet 22 being supported on the annular surface 20b of the spacing ring 20.

In order to record on the diagram sheet 8, while allowing assembly of both diagram sheets 8 and 22, a carrier 10 is mounted on casing or lid 3 for angular movement about pivots 11. The axis of pivots 11 of carrier 10 is parallel to the axis 2a, and preferably located in the closing plane of casing 3. This prevents the closing of the casing or lid 3 before carrier 10 has been moved to a recording position abutting the rim of the casing 3, as shown for a modified embodiment in FIG. 8. In the retracted servicing position shown in FIG. 1 diagram sheet 8 can be mounted on center pin 6, and in the recording position of carrier 10 shown in FIG. 3, carrier 10 permits the mounting of the second diagram sheet 22 on the top surface 20b of the spacing ring 20.

Figure 2:
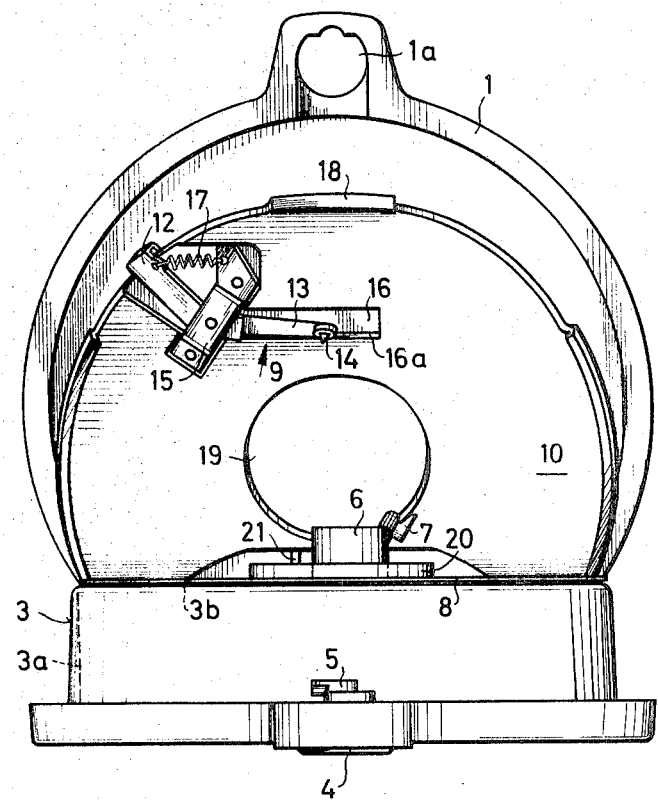
FIG. 2 is a fragmentary schematic front view of the embodiment of FIG. 1.

In the embodiment illustrated in FIGS. 1 and 2, carrier 10 is angularly movable to the recording position substantially covering the diagram sheet 8, and providing a stationary surface 10a on which the diagram sheet 22 is guided, and supported against the slight pressure exerted by recording means 23.

In the recording position of carrier 10, the recording means 9 is operative since its recording point 14 is positioned to record on the diagram sheet 8 which was mounted on center pin 6 while carrier 10 was in the retracted inoperative position shown in FIG. 1.

The recording means 9 includes an angular lever having at one end a recording point 14 and at the other end an actuating part 12 including a U-shaped bent portion embracing carrier 10, as shown in FIGS. 1, 2 and 3, and being provided with a coupling pin 12a cooperating with measuring means in casing 1 when carrier 10 is in the recording position, and casing 1 is closed by casing lid 3. A part 47 of the measuring means in casing 1, is shown in FIG. 8, which also shows the actuating and coupling portion 12a which cooperates with the portion 47 of the measuring means when the lid 3 is moved to a position abutting the edge of casing 1 and closing the same, while the modified carrier 36 is located in casing 1.

The arm 13 of recording means 9 is preferably made slightly resilient so that resilient pressure is exerted by the recording point 14 on the diagram sheet 8.

A bridge member 15 is secured to carrier 10 located in a portion of the cutout 16 in the wall of carrier 10. The angular lever 12, 13 is supported by a pin in bridge 15 for angular movement, and is biased by spring 17 to engage the straight edge 16a of the cutout 16, so that the entire recording means is located in portions of cutout 16, and only the recording point 14 projects into the space between the supporting surfaces 20b and 3b, as best seen in FIG. 3.

Carrier 10 has a short peripheral flange portion 18, located radially outward of the peripheral edge of the respective digaram sheet 8, and abutting in the recording position of carrier 10, on the circular rim of the casing lid 3. Carrier 10 has a central opening 19 which permits the assembly and turning of the spacing and coupling ring 20. Consequently, spacing ring 20 can rotate together with the clockwork 3 within the circular opening 19 of the carrier wall.

The cover lid 3 is provided with a stop 21 which limits the angular movement of carrier 10 in a desired retracted position which permits the assembly of the second diagram sheet 22, as described with reference to FIG. 3.

It is preferred to make the wall of carrier 10 of a transparent synthetic material which permits observation of the diagram sheet 8, even if carrier 10 is in the recording position covering diagram sheet 8. Diagram sheet 22 is located above the wall of carrier 10 in the recording position abutting the casing 3, and can be removed without difficulty when the casing means 1, 3 is opened.

When the casings 1 and 3 are in the open position shown in FIG. 1, and carrier 10 is in the retracted position shown in FIG. 1 with diagram sheet 8, then spacing ring 20 is placed on the centering pin 6, whereupon carrier 10 is turned to the recording position abutting casing 3 and surrounding spacing ring 20, whereupon the diagram sheet 22 can be placed with its hole 22a on center pin 6, abutting the annular surface 20b. By shifting the clamping lever 7, diagram sheets 8 and 22 and spacing ring 20 are clamped in axial direction to the clockwork driven supporting surface 3b. The central pin 6 has a non-circular periphery, and the center bores 8a, 20a and 22a have corresponding matching configuration so that torque is not only transmitted by friction, but also by engagement of coupling projections. When the casing lid 3 is closed, the recording means 23 in casing 1 become effective for recording the speed of the motor car, the distance traveled, and the time periods during which the car was operated in the form of recordings on the diagram sheet 22.

Figure 4:
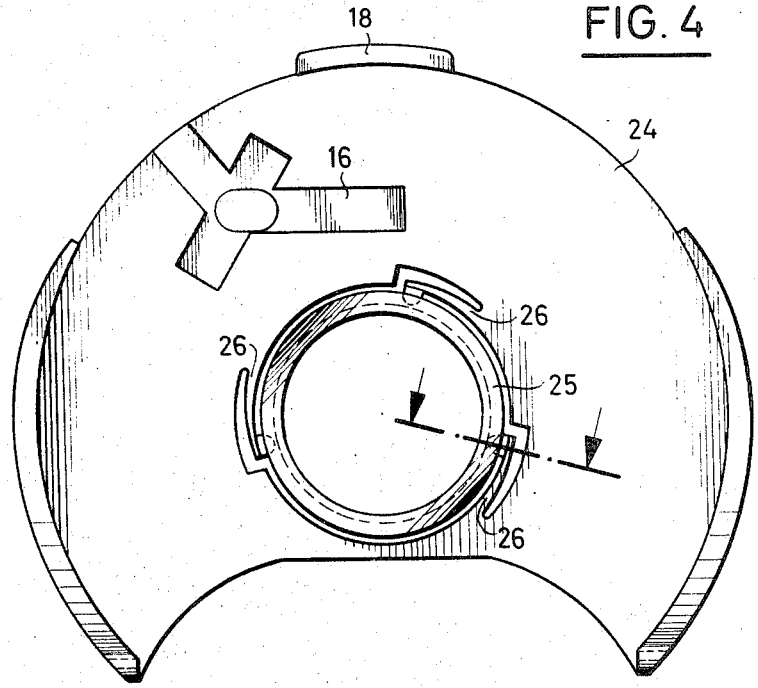
FIG. 4 is a fragmentary schematic plan view illustrating a modified carrier rotatably supporting the spacing ring.
Figure 5:
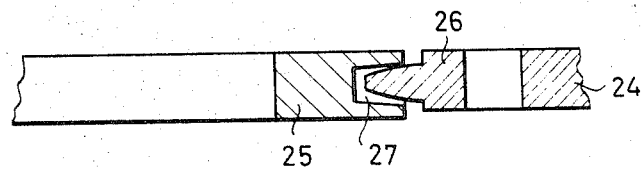
FIG. 5 is a fragmentary sectional view taken on line V—V in FIG. 4.

In order to avoid the possibility that the spacing ring 20 is lost, and also in order to facilitate the reliable insertion of the diagram sheets 8 and 22, the modified embodiment of FIG. 4 provides a modified carrier 24, corresponding to carrier 10, but supporting a spacing ring 25 in a manner which prevents separation of the spacing ring from the carrier 24, while permitting rotation of the spacing ring 25. For this purpose, radially resilient coupling fingers 26 are provided on carrier 24 which engage a circular peripheral groove 27 in the rim of spacing ring 25 so that the spacing ring 25, when clamped to the supporting surface 3b of the clockwork 3a, can rotate relative to the stationary carrier 24, but remains connected with carrier 24 by fingers 26 when carrier 24 is tilted to the retracted servicing position in which the diagram sheet 8 and clamping lever 27 are accessible.

Figure 7:
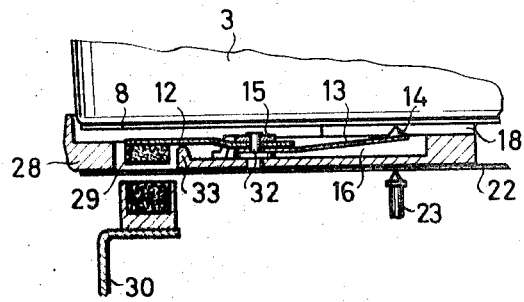
FIG. 7 is a fragmentary sectional view taken on line VII—VII in FIG. 6.
Figure 6:
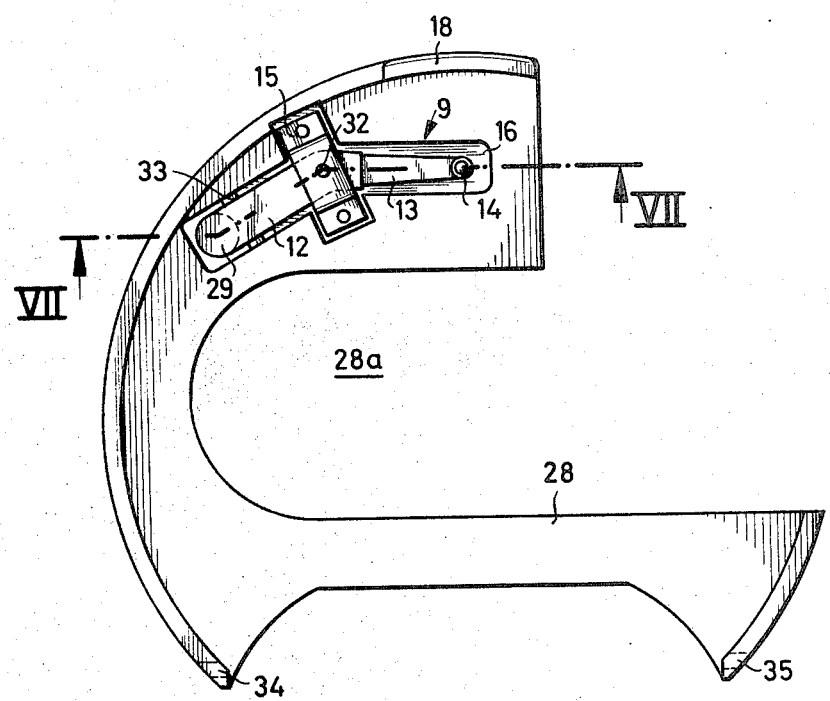
FIG. 6 is a fragmentary schematic plan view illustrating a modified embodiment of the invention in which recording means are connected with measuring means by magnets located on opposite sides of a diagram sheet.

Another modification is illustrated in FIGS. 6 and 7. As in the embodiment of FIGS. 1 and 2, the modified carrier 28 has a cutout 16 which an angular lever 9 is mounted whose arm 13 is resilient and carries the recording point 14, but on the other actuating arm 12, a permanent magnet 29 is mounted, located on the wall of carrier 28 between the diagram sheets 8 and 22, diagram sheet 8 being engaged by the recording point 14 as best seen in FIG. 7.

Permanent magnet 29 cooperates with a permanent magnet 31 mounted on the output member 30 of a measuring means provided in casing 1. In according with the measured value, such as the speed of the motor car, magnet 31 is displaced, and displaces through the magnetic field, magnet 29 and thereby the recording point 14 to record accordingly on the diagram sheet 8. The construction of FIGS. 6 and 7 eliminates the U-shaped portion of arm 12 embracing the peripheral edge of the carrier 10, described with reference to FIG. 1. Due to the provision of the magnetic coupling 31, 29, the entire cylindrical space within casing 1 is used for diagram sheets 8 and 22.

The magnetic coupling 31, 29 produces a tilting force about the pivot 10, 32 of the angular lever 12, 13, which is compensated by the action of a stop 33 provided on carrier 28, and engaged by the arm 12 when the recording point 14 records on diagram sheet 8 in the recording position of carrier 28. The bridge 15, secured to the wall of carrier 28, secures the recording means 9 in axial direction.

The modified carrier 28 forms a tiltable bearing point for the recording means 9, and provides a recording support for the diagram sheet 22. Due to the particular shape of the wall of carrier 28, which, as best seen in FIG. 6, is partly circular to correspond to the circular rim of casing 3, it may be mounted for angular movement about the pivot pins 34, 35 for movement between the retracted servicing position and the recording position.

It is possible to provide only one pivot 34 for mounting the carrier 28 for angular movement.

Due to the large cutout 28a, the diagram sheet 8 is particularly accessible for checking the recordings thereon. It is only necessary to lift the edge of the diagram sheet 22.

Figure 9:
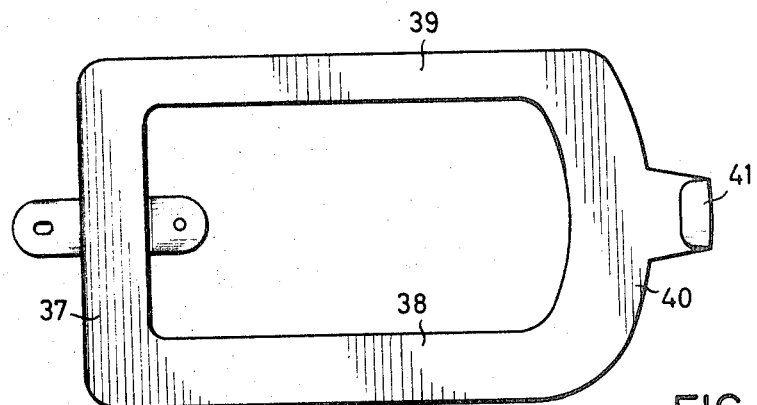
FIG. 9 is a plan view of the leaf spring.

FIG. 8 illustrates a modified embodiment in which the diagram sheet 22 is automatically lifted when the casing lid 3 is opened. As shown in FIG. 9, a thin leaf spring 37 has parallel portions 38 and 39 connected at one end by transverse portion 37 and at the other hand by transverse portion 40 which includes a hook portion 41 which embraces the edge of the diagram sheet 22 which has freedom of rotation of the diagram sheet 22 in relation to a plate 42 covering the measuring parts located in casing 1. When ccasing lid 3 is opened, the spring 37 effects lifting of a portion of diagram sheet 22, as shown in FIG. 8, so that diagram sheet 22 can be easily removed, or diagram sheet 8 can be obseved.

As further shown in FIG. 8, carrier 36, which is made of a transparent material to permit observation of the diagram sheet 8, differs from carrier 10 also in that its peripheral flange 43 extends around the peripheral edge of the diagram sheet 8, and also about the rim of the casing lid 3. Consequently, carrier 36 forms with the inner cylindrical wall of the casing lid 3, a closed compartment which in the illustrated embodiment can be locked in a simple manner by a resilient catch 44 engaging an opening 45 in casing 3.

It is also possible to lock the carrier 36 in position by a magnet secured to casing lid 3 in the region of the short flange 18 shown in FIG. 2, cooperating with a flange 18 formed of magnetizable material.

Recording means 9, whose recording point 14 may record a stepped graph 46, or a broad recording, or a zig-zag recording, is connected by the coupling and actuating portion 12a with the part 47 of the measuring means in casing 1 so that the recordings made by recording point 14 on diagram sheet 8 represent values obtained by the measuring means during operation of the car. Evidently, additional recording means may be provided for recording on diagram sheet 8 and operated as described with reference to the recording means 9.

Figure 10:
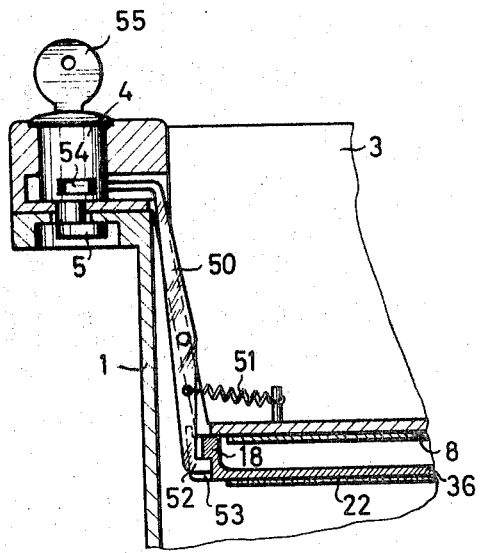
FIG. 10 is a fragmentary sectional view illustrating on an enlarged scale, locking means for locking the carrier in the recording position to the casing lid of the instrument shown in FIG. 8.

A modification of the locking means is shown in FIG. 10. The locking is carried out by means of a double-armed lever 50 which is mounted on the wall of casing lid 3 for angular movement, and is biased by spring 51. The locking position 52 provided at the end of one arm of lever 30, is arranged in carrier 36, preferably in the region of the flange 18 for cooperation with a stepped slot 53, while the other arm of lever 50 cooperates with a lug 54 provided at the cylinder of lock 4. The position of lug 54 on the lock cylinder can be selected so that the compartment formed by the carrier 36 and casing lid 3, can be unlocked by turning a conventional key 55 after opening of the cover lid 3. It is also contemplated to permit a turning of the lock 3 in one or the opposite direction only when a second special key is used, which may be given to a person authorized for inspecting the recordings, or, such as a second driver whose operations are recorded on the diagram sheet 8.

It will be understood that each of the elements described above, or two or more together, may also find a useful application in other types of recording instruments for two diagram sheets differing from the type described above.

While the invention has been illustrated and described as embodied in a recording instrument for two diagram sheets including a pivotally mounted carrier for recording means located between two diagram sheets rotated in synchronism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Recording instrument for two diagram sheets, comprising a first casing; a clockwork therein; a first support having a first supporting surface for a first diagram sheet, and being mounted in said first casing and rotated by said clockwork about an axis, a second support having a second supporting surface for a second diagram sheet spaced from said first supporting surface in axial direction, and attaching means for detachably connecting said first and second supports so that said second support rotates with said first support whereby said first and second diagram sheets rotate in synchronism in parallel first and second recording planes;

a carrier mounted on said first casing for angular movement about a second axis transverse to said axis and parallel to said recording planes between a recording position abutting said first casing and a retracted servicing position; first recording means mounted on said carrier and having a recording point on one side of said carrier located in the space between said first and second recording planes for recording on said first diagram sheet, and an actuating coupling part located on the other side of said carrier remote from said space, said second supporting surface being also located on said other side;

a second casing connected with said first casing so that said first and second casings have a closed position enveloping said carrier in said recording position and an open position in which said carrier can be moved to said retracted servicing position; measuring means mounted in said second casing and having a coupling part connected in said closed position with said actuating coupling part of said recording means for moving said recording means to record in said recording position on said first diagram sheet; and second recording means mounted in said second casing for recording on said second diagram sheet whereby recordings are made simultaneously on said first and second diagram sheets.

2. Recording instrument as claimed in claim 1, wherein said first and second casings include hinge means connecting said first and second casings for movement between said open and closed positions about a third axis parallel to said second axis.

3. Recording instrument as claimed in claim 2, wherein said second and third axes coincide.

4. Recording instrument as claimed in claim 1, wherein said carrier in said recording position is substantially located in said second recording plane for supporting said second diagram sheet against the recording pressure of said second recording means; and wherein said carrier has a peripheral portion holding the peripheral portion of said first diagram sheet on said first casing and including a flange portion extending over at least a part of a rim of said first casing.

5. Recording instrument as claimed in claim 1, wherein said carrier includes a wall at least partly covering said first diagram sheet in said recording position of said carrier.

6. Recording instrument as claimed in claim 1, wherein said first casing has an annular rim; and wherein said carrier includes a wall having an annular flange extending along said annular rim to form a compartment with said first casing in said recording position of said carrier.

7. Recording instrument as claimed in claim 1, wherein said second support is a spacing ring concentric with said first axis and having a first annular surface abutting said first support, and a second annular surface which is said second support surface for supporting said second diagram sheet; wherein said first support includes a pin passing through central openings in said first and second diagram sheets and in said spacing ring; and wherein said attaching means include a clamping lever for clamping said second support to said first support.

8. Recording instrument as claimed in claim 7, wherein said spacing ring is rotatably mounted in said carrier so that said spacing ring moves away from said first support and from said first diagram sheet when said carrier is moved to said retracted servicing position.

9. Recording instrument as claimed in claim 1, comprising locking means for locking said carrier in said recording position to said first casing so that said first diagram sheet is inaccessible.

10. Recording instrument as claimed in claim 9, wherein said locking means include a lock mounted on said first casing, a lever system connecting said lock with said carrier, and a key fitting into said lock for operating said lever system to lock and unlock said carrier.

11. Recording instrument as claimed in claim 1, comprising magnetic arresting means for magnetically holding said carrier in said recording position abutting said first casing.

12. Recording instrument as claimed in claim 1, wherein said carrier has a wall at least partly covering in said recording position said first diagram sheet and being transparent for observation of recordings made by said first recording means on said first diagram sheet.

13. Recording instrument as claimed in claim 1, comprising lifting means mounted on said carrier for lifting said second diagram sheet at least partly when said first and second casings are in said open position.

14. Recording instrument as claimed in claim 1, wherein sid carrier includes a leaf spring located under said second diagram sheet and biasing the same to partly move away from said second supporting surface and from said carrier for easy gripping in said open position of said first and second casings; and wherein said second casing includes means for flattening in said closed position said second diagram sheet on said second supporting surface and on said carrier against the action of said leaf spring.

15. Recording instrument as claimed in claim 1, wherein said first recording means include a double armed lever pivotally mounted on said carrier, and having an arm with said recording point and an other arm forming said actuating coupling portion cooperating with said coupling part of said measuring means.

16. Recording instrument as claimed in claim 15, wherein said actuating coupling portion is U-shaped and embraces the peripheral rim of said carrier, said U-shaped actuating coupling portion having a coupling element cooperating with said coupling part of said measuring means.

17. Recording instrument as claimed in claim 15, wherein said first recording means include a magnet mounted on said other arm and constituting said actuating coupling portion; and wherein said coupling part of said measuring means includes an other magnet, said magnets being located on opposite sides of said second diagram sheet and cooperating with each other so that said first recording means is displaced in accordance with the value measured by said measuring means.

* * * * *